United States Patent
Austin et al.

(10) Patent No.: US 6,428,280 B1
(45) Date of Patent: Aug. 6, 2002

(54) STRUCTURE WITH CERAMIC FOAM THERMAL BARRIER COATING, AND ITS PREPARATION

(75) Inventors: Curtiss Mitchell Austin; Richard John Grylls, both of Loveland, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/708,954

(22) Filed: Nov. 8, 2000

(51) Int. Cl.$^7$ ................................. F01D 5/14
(52) U.S. Cl. ..................... 416/241 B; 416/229 A; 427/419.2; 428/613; 415/200
(58) Field of Search .................. 416/241 B, 229 A, 416/230; 427/419.2, 419.3, 226, 454, 455; 428/613, 621, 628, 629, 469, 699, 702, 304.4, 312.8; 415/200

(56) References Cited

U.S. PATENT DOCUMENTS

| | | | |
|---|---|---|---|
| 4,673,435 A | 6/1987 | Yamaguchi et al. | 75/235 |
| 5,214,011 A | 5/1993 | Breslin | 501/127 |
| 5,514,482 A * | 5/1996 | Strangman | 428/623 |
| 5,518,061 A | 5/1996 | Newkirk et al. | 164/97 |
| 5,538,796 A * | 7/1996 | Schaffer et al. | 428/469 |
| 5,728,638 A | 3/1998 | Strange et al. | 501/127 |
| 5,876,860 A * | 3/1999 | Marijnissen et al. | 428/623 |
| 6,177,200 B1 * | 1/2001 | Maloney | 428/472 |

* cited by examiner

*Primary Examiner*—F. Daniel Lopez
*Assistant Examiner*—James M McAleenan
(74) *Attorney, Agent, or Firm*—David L. Narciso; Gregory O. Garmong

(57) ABSTRACT

A protective structure includes a substrate made of a nickel-base superalloy component of a gas turbine engine, and a ceramic thermal barrier coating overlying and bonded to the substrate. The ceramic coating is an open-cell solid foam of aluminum oxide ceramic cell walls having a porous interconnected intracellular volume therebetween. The ceramic coating is prepared by depositing a precursor material onto the surface of the substrate. The precursor material includes a sacrificial ceramic, typically silicon dioxide, and a reactive metal, typically aluminum, which is reactive with the sacrificial ceramic to form an open-celled ceramic foam. The sacrificial ceramic and the reactive metal are reacted together to form ceramic cell walls of an oxidized ceramic of the reactive metal, preferably aluminum oxide, and an interconnected intracellular volume therebetween filled with an intracellular metal. The intracellular metal is thereafter removed to leave a porous intracellular volume.

20 Claims, 5 Drawing Sheets

STRUCTURE WITH CERAMIC FOAM THERMAL BARRIER COATING, AND ITS PREPARATION

This invention relates to ceramic thermal barrier coatings on substrates, and, more particularly, to aircraft gas turbine components protected by such coatings.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the hot-section components of the engine. These components include the turbine vanes and turbine blades of the gas turbine, upon which the hot combustion gases directly impinge. In current engines, the turbine vanes and blades are made of nickel-based superalloys, and can operate at temperatures of up to about 1800–2100° F. These components are also subject to damage by oxidation and corrosive agents, as well as impact damage and erosion by particles entrained in the combustion gas stream.

Many approaches have been used to increase the operating temperature limit and service lives of the turbine blades and vanes to their current levels, while achieving acceptable oxidation, corrosion, erosion, and impact resistance. The composition and processing of the base materials themselves have been improved. Cooling techniques are used, as for example by providing the component with internal cooling passages through which cooling air is flowed.

In another approach used to protect the hot-section components, some of the surfaces of the turbine blades and vanes are coated with thermal barrier coating systems. The thermal barrier coating systems typically include a bond coat that contacts the substrate, and a ceramic thermal barrier coating (TBC) layer overlying the bond coat. The bond coat protects the articles against the oxidative and corrosive effects of the combustion gas. The ceramic layer provides thermal insulation and some environmental protection. The turbine blades and turbine vanes are thereby able to run cooler and are more resistant to environmental attack in the presence of the thermal barrier coating systems.

Although the thermal barrier coating approach is operable, there is opportunity for improvement. It would be desirable to improve the thermal insulation properties of the ceramic thermal barrier coating, as well as to increase its resistance to impact damage. The present invention fulfills this need, and further provides related advantages.

BRIEF SUMMARY OF THE INVENTION

The present invention provides a structure in which a substrate is protected by an overlying ceramic layer. The ceramic layer has improved insulation properties as compared with prior ceramic layers, as well as improved resistance to impact damage. The ceramic layer of the invention is compatible with the use of bond coats, and in some circumstances dispenses with the need for a bond coat.

A structure comprises a substrate, and a ceramic coating overlying and bonded to the substrate. The ceramic coating comprises an open-cell solid foam of ceramic cell walls having an interconnected intracellular volume therebetween.

Within this broad concept, a number of features and embodiments are particularly preferred. Preferably, the substrate comprises a nickel-base superalloy and is a component of a gas turbine engine. The ceramic cell walls comprise aluminum oxide, but there may be additions of ceramic modifiers to improve specific properties such as impact resistance. The ceramic cell walls preferably exceed about 60 percent by volume, and most preferably comprise from about 60 to about 80 percent by volume, of the foam. A bond coat may be disposed between the substrate and the ceramic coating, to aid in bonding the ceramic coating to the substrate.

Most preferably, the intracellular volume is substantially empty and porous, although it may be filled wholly or partially with a metal. The portion of the ceramic coating which is porous offers improved insulation of the underlying substrate. It also affords increased resistance to impact damage, as it may locally crush and fracture without introducing cracks which propagate for long distances through the ceramic coating and possibly cause the ceramic coating to delaminate.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
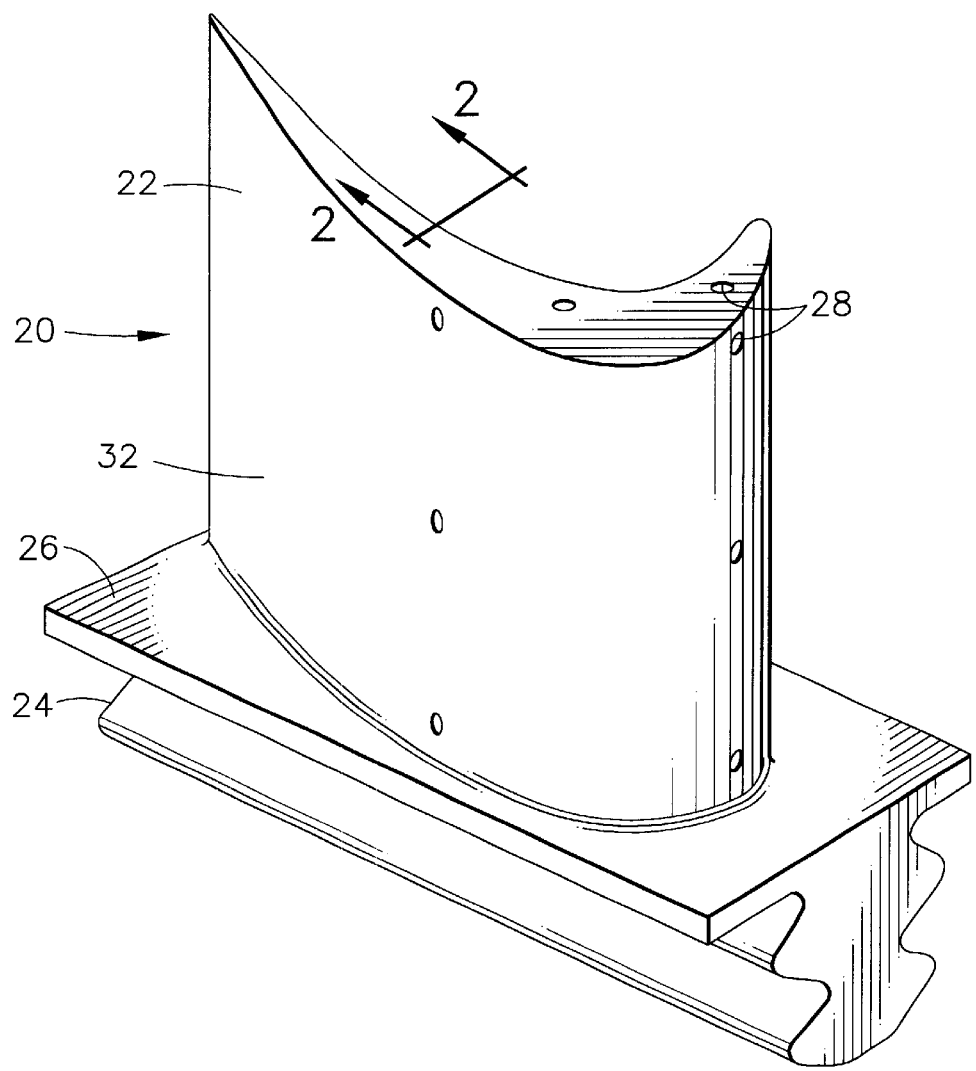
FIG. 1 is a perspective view of a turbine blade.

FIG. 1 depicts a gas turbine engine component such as a turbine blade or turbine vane, and in this illustration a turbine blade 20. The turbine blade 20 is preferably formed of a nickel-base superalloy. As used herein, a disclosure of a metal includes both the pure form of the metal and its alloys. For example, "nickel" includes pure nickel and nickel-base alloys. As used herein, "metal-base" means that the composition has more of the named metal present than any other element. For example, a nickel-base alloy has more nickel than any other element. The nickel-base alloy may additionally be a nickel-base superalloy, meaning that it is of a composition which is strengthened by the precipitation of gamma-prime phase. A typical nickel-base alloy has a composition, in weight percent, of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities.

The turbine blade 20 includes an airfoil 22 against which the flow of hot exhaust gas is directed. (The turbine vane has a similar appearance in respect to the pertinent portions.) The turbine blade 20 is mounted to a turbine disk (not shown) by a dovetail 24 which extends downwardly from the airfoil 22 and engages a slot on the turbine disk. A platform 26 extends laterally outwardly from the area where the airfoil 22 is joined to the dovetail 24. One or more internal passages extend through the interior of the airfoil 22, ending in openings 28 in the surface of the airfoil 22. A flow of cooling air is directed through the internal passages, to reduce the temperature of the airfoil 22. A thermal barrier coating system 32 is applied to at least some portions of the airfoil 22.

Figure 2:
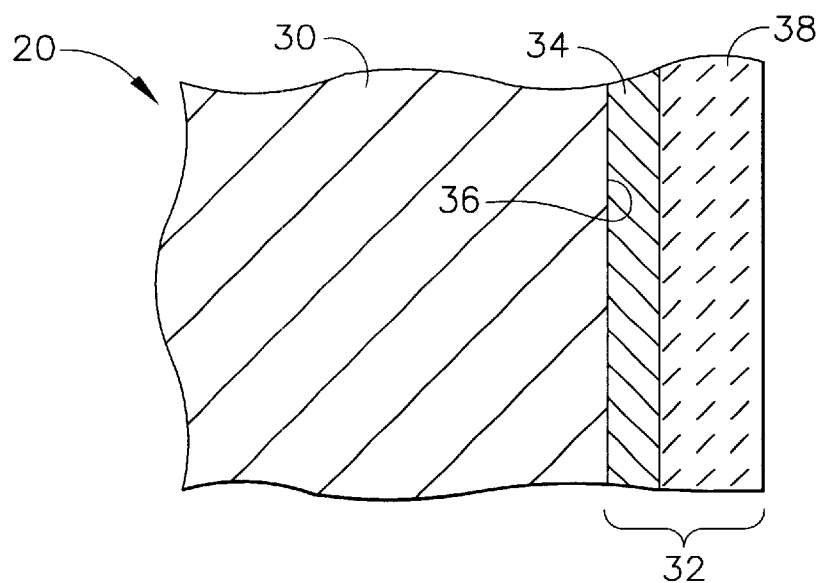
FIG. 2 is an enlarged schematic sectional view through the turbine blade of FIG. 1, illustrating the coating structure.

FIG. 2 depicts in enlarged sectional view a region of the turbine blade 20, which serves as a substrate 30 for a thermal barrier coating system 32. The thermal barrier coating system 32 includes an optional bond coat layer 34 bonded to a surface 36 of the substrate 30. The bond coat layer 34, which may be omitted in some circumstances, may be of any type known in the art. Examples include simple diffusion aluminides, diffusion aluminides modified with the addition of alloying elements such as platinum, or MCrAl(X)-type bond coats. A layer of a ceramic coating 38, which may also be described as a ceramic thermal barrier coating, is bonded to the bond coat layer 34 and thence to the substrate 30.

Figure 3:
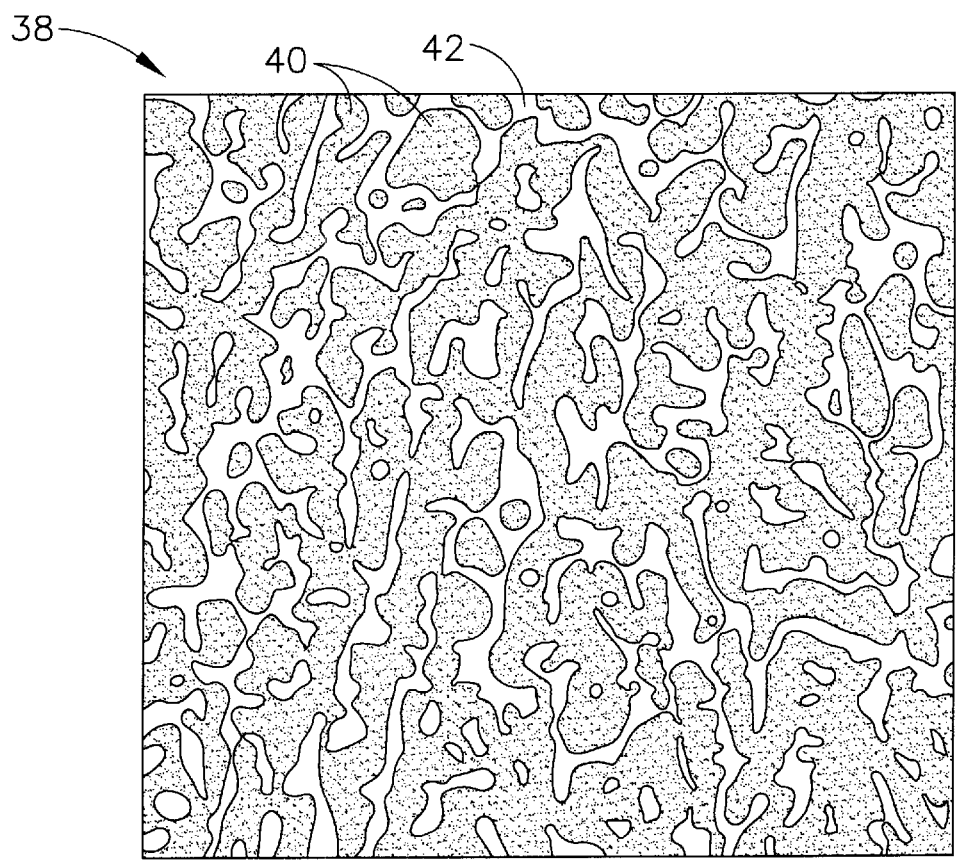
FIG. 3 is an depiction of the microstructure of the open-cell solid ceramic foam.

FIG. 3 is an idealized microstructure of the ceramic coating 38. The ceramic coating 38 comprises an open-cell solid foam of ceramic cell walls 40 having an interconnected intracellular volume 42 therebetween. The ceramic cell walls 40 preferably comprise no less than 60 volume percent of the ceramic coating 38. Most preferably, the ceramic cell walls comprise from about 60 volume percent to about 80 volume percent of the solid foam. If the ceramic cell walls 40 comprise less than about 60 volume percent of the ceramic coating 38, the ceramic coating 38 may have insufficient strength.

The open-cell solid foam material comprises two interpenetrating phases, the ceramic cell walls 40 and the intracellular volume 42. The ceramic cell walls 40 are continuous within themselves, and the intracellular volume 42 is internally continuous within itself. A consequence of this structure is that either of the regions 40 or 42 may be removed in whole or in part to produce internal porosity, but in this case the material within the intracellular volume is removed at least in part to create the ceramic foam of the ceramic coating 38. The ceramic cell walls 40 have a continuous, self-supporting structure which maintains the physical integrity of the ceramic foam and thence gives the ceramic foam material of the ceramic coating 38 the outward appearance and function of a solid body with a skeletal morphology.

The ceramic material comprises a base ceramic such as aluminum oxide. Any compatible modifying ceramic may be used to achieve particular properties in the ceramic region, with the modifying ceramic present in an operable amount. For example, the modifying ceramic may be a ceramic material that is harder and more wear resistant and/or erosion resistant than the base ceramic. Some examples of abrasive modifying ceramics that are more wear or abrasion resistant than aluminum oxide and may be mixed with the aluminum oxide base ceramic include sol gel alumina and boron carbide. Other modifications may be made to favorably influence the behavior of the coating such as by reducing thermal conductivity (zirconia addition), increasing thermal expansion coefficient (zirconia addition), increasing resistance to gaseous environmental attack, increasing resistance to attack from solid or liquid contaminants, and achieving better surface characteristics (for example, smoothness, sealing or infrared reflectivity, as by small additions of iron, copper, or magnesium). Some of these modifications may be made at a later stage of the processing, such as by infusing the coating with a substance that affects the composition of the alumina or by applying a further coating to the surfaces of the ceramic coating 38, such as by application of additional ceramic plasma spray, electron beam physical vapor deposition or other means.

The intracellular volume 42 occupies the remainder of the volume of the foam material of the ceramic coating 38. Because the intracellular volume 42 occupies less than half of the total volume, it is difficult to see from a planar microstructure such as FIG. 3 that the individual portions of the intracellular volume 42 are interconnected, but such is the case.

The intracellular volume 42 is at least partially empty space, so that the ceramic coating 38 is a skeletal structure formed by the ceramic cell walls 40. Some or all of the region of the intracellular volume 42 near the substrate 30 or bond coat 34 may be filled with a metal having a composition similar to that of the adjacent substrate 30 or bond coat 34, or a metal with an increased aluminum content as compared with the substrate 30 or bond coat 34, or mostly aluminum. The fill material is chosen as appropriate to increase bond strength and oxidation resistance at the outward surfaces of the substrate 30 or bond coat 34.

Figure 4:
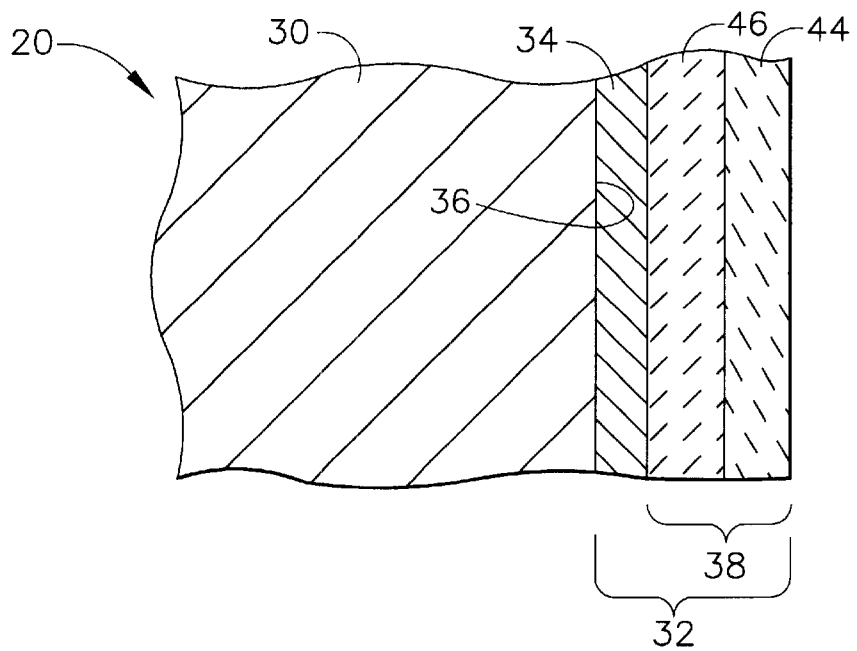
FIG. 4 is an enlarged schematic sectional view like that of FIG. 2, illustrating another coating structure.

FIG. 4 illustrates one such form of the ceramic coating 38. Throughout the entire ceramic coating of FIG. 4, the ceramic cell walls 40 (referring to FIG. 3) are the same, locally about 60 to about 80 volume percent of the ceramic coating 38. In a surface region 44 the intracellular volume 42 is empty and porous. In an interior region 46 the intracellular volume 42 is filled with a metal such as an aluminum-base alloy or a nickel-base alloy. The use of an aluminum-base alloy in the intracellular volume 42 of the interior region 46 may allow the bond coat layer 34 to be omitted, as the aluminum-base alloy in the intracellular volume 42 may both aid in the bonding of the ceramic coating 38 to the substrate 30 and also provide the protection against oxidation and hot corrosion that is normally provided by an aluminum-base bond coat 34.

Many other variations of the ceramic coating 38 are possible due to the ability to selectively remove portions of the ceramic cell walls 40 or the metal in the intracellular volume 42 at different places.

Figure 5:
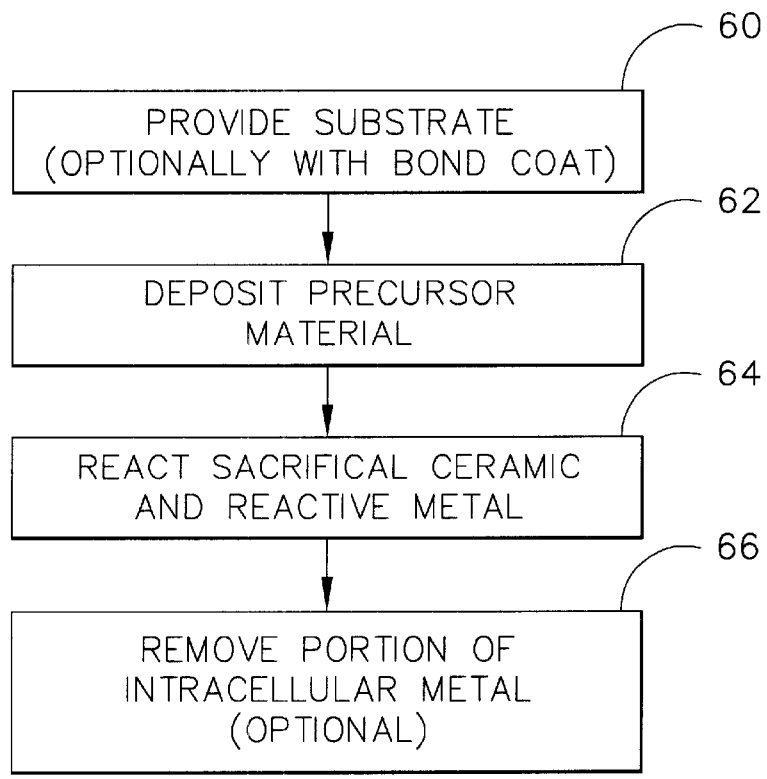
FIG. 5 is a block flow diagram of an approach for producing the coating structure.

FIG. 5 is a block flow diagram of a preferred approach for practicing the invention. The substrate 30 is provided, numeral 60. There may optionally be a previously deposited bond coat layer 34 already overlying and bonded to the surface 36 of the substrate 30.

The ceramic coating 38 is preferably prepared using the reactive techniques disclosed in U.S. Pat. Nos. 5,214,011 and 5,728,638, as modified for purposes of producing a coating. In this approach, the precursor material is deposited, numeral 62. The precursor material includes a sacrificial ceramic form in the shape of the ceramic coating 38, and a reactive metal such as aluminum. The sacrificial ceramic form is preferably made of silicon dioxide (silica). This material is termed a "sacrificial" ceramic because it is consumed during the subsequent reaction process. Silicon dioxide may be deposited in the required thickness of the ceramic coating 38 by any operable technique, such as the application of a slurry of silicon dioxide frit in a carrier by painting, dipping or spraying; plasma spraying of silicon dioxide; or chemical vapor deposition. The deposited silicon dioxide is fired by heating the deposit to a temperature of about 1975° F. for a period of about one hour, to consolidate and fuse the silicon dioxide. The firing process may be varied in order to influence the degree and morphology of the porosity. The reactive metal, such as aluminum, may be deposited by any operable technique, such as applying an aqueous slurry containing the reactive metal, and subsequently allowing the slurry to dry. The reactive metal may optionally be mixed with nonreactive metals such as a large fraction of nickel and other elements of the nickel-base alloy of interest for some applications, as disclosed in the '638 patent.

Figure 6:
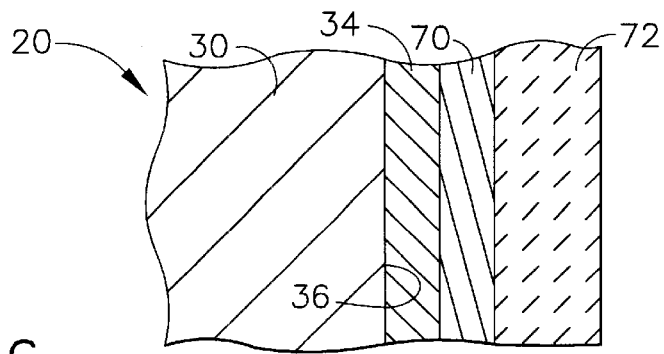
FIG. 6 is a schematic sectional view of the turbine blade with a first form of a precursor structure.
Figure 7:
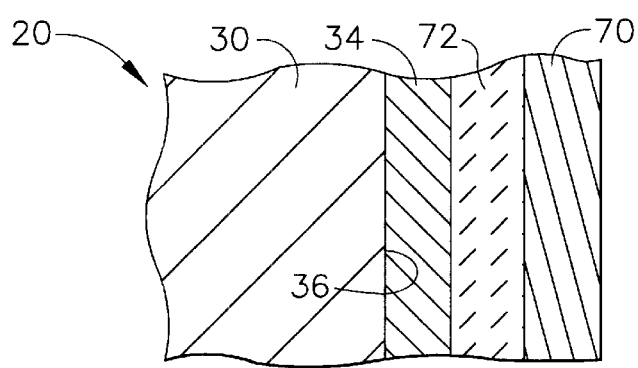
FIG. 7 is a schematic sectional view of the turbine blade with a second form of a precursor structure.
Figure 8:
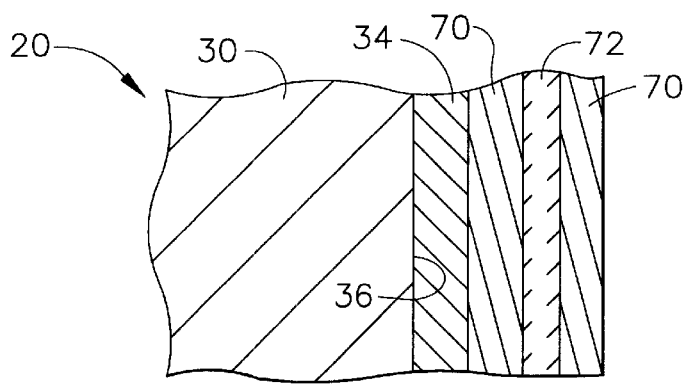
FIG. 8 is a schematic sectional view of the turbine blade with a third form of a precursor structure.
Figure 9:
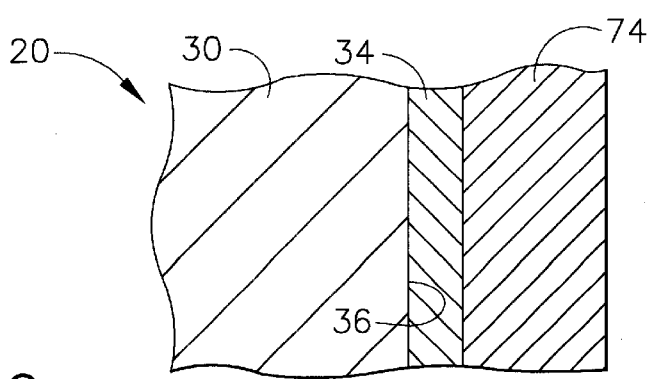
FIG. 9 is a schematic sectional view of the turbine blade with a fourth form of a precursor structure.

The precursor material may be deposited in any of a variety of forms, and FIGS. 6–9 illustrate some of these forms. As shown in FIGS. 6–8, the reactive metal is deposited in a reactive metal layer 70 and the sacrificial ceramic is deposited in a sacrificial ceramic layer 72. The layer 70 may be adjacent to the bond coat 34 (or the substrate 30 if no bond coat is present) and the layer 72 may be remote from the bond coat 34, as in FIG. 6. The layer 72 may be adjacent to the bond coat 34 (or the substrate 30 if no bond coat is present) and the layer 70 may be remote from the bond coat 34, as in FIG. 7. There may be a layer 70 adjacent to the optional bond coat 34, a layer 70 remote from the bond coat 34, and a layer of the sacrificial ceramic 72 sandwiched between them, as in FIG. 8. In yet another approach, illustrated in FIG. 9, the reactive metal and the sacrificial ceramic may be co-deposited in a single layer 74.

The sacrificial ceramic and the reactive metal are reacted together by heating them to a reaction temperature well in excess of the melting point of the reactive metal, numeral 64. Normally, the step 64 is performed after the step 62 is complete, but it may be preferred in some cases to perform the steps simultaneously so that the reaction occurs as the precursor material is deposited. In the case of aluminum, the reaction temperature is greater than the melting point of aluminum by an amount exceeding about 300° C. During this reaction, the ceramic of the sacrificial ceramic form is chemically reduced and the reactive metal is chemically oxidized. (Reduction and oxidation are broadly interpreted in the sense of electron transfer.) The reactive metal becomes an oxide or oxidized form, aluminum oxide in the preferred case. As a result of a mechanism involving volume changes and discussed in the '011 patent, the foam or sponge structure is formed throughout the ceramic as it transforms from the sacrificial form-composition to the final composition. The intracellular volume that results is filled with a reaction-product metal.

Optionally but preferably for the present applications, selected portions of the reaction-product metal present in the intracellular volume 42 are removed, numeral 66, as might be necessary for particular structures. In some cases, portions of the ceramic of the ceramic cell walls 40 may be removed. Because each of the regions 40 and 42 is continuous, all or some of each of the regions 40 and 42 may be removed without affecting the other region. Some or all of the metal present in the cooled article at this point may be chemically removed by etching in an appropriate chemical. For example, aluminum may be removed by reaction with HCl or NaOH solutions. An electrical field may be applied so that the metal is removed anodically. Some of the ceramic that forms the cell walls 40 may be chemically removed. For example, aluminum oxide may be removed by alkaline solutions such as KOH or NaOH, where aluminum has been previously removed. Different portions of the metal and the ceramic may be removed for various reasons. For example, all of the metal in the intracellular volume 42 may be removed to produce a completely skeletal ceramic coating 38, as discussed in relation to FIG. 2. The metal may instead be removed only near the exposed surface to create the surface region 44 and remaining interior region 46 of FIG. 4.

Figure 10:
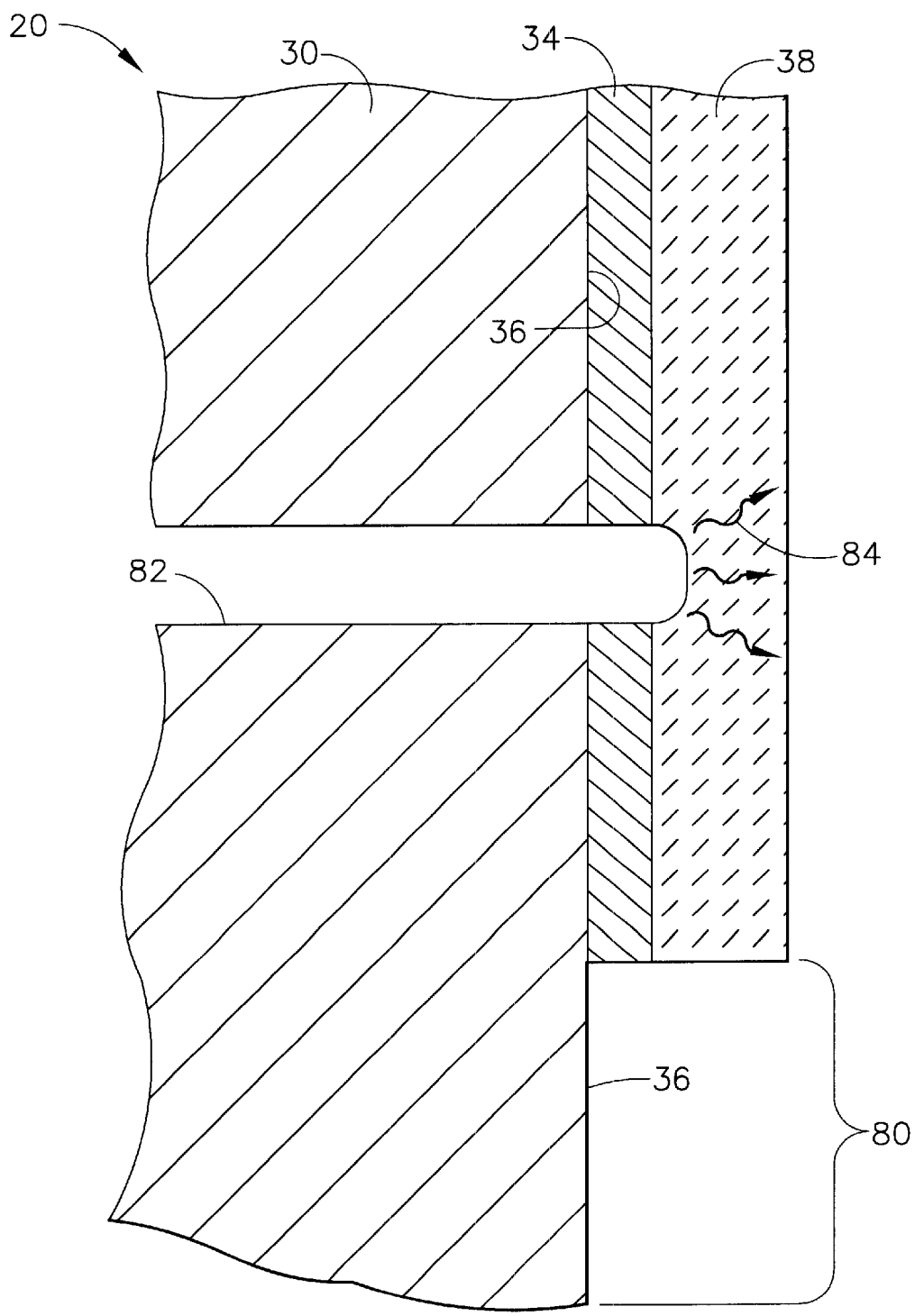
FIG. 10 is a schematic sectional view of the turbine blade with a patterned ceramic coating layer.

The present approach offers great flexibility to form protected structures of various arrangements. FIG. 10 illustrates two further possibilities. In an unprotected region 80, no bond coat 34 or ceramic coating 38 is applied, leaving the surface 36 completely bare. This structure is achieved by masking the region 80 during deposition, or by forming the protective structure and later removing it in the region 80. A bare surface is sometimes required, for example to permit braze attachments and the like to the substrate 30.

In another option, a cooling-air passage 82 is drilled from the back side or interior of the turbine blade 20, through the optional bond coat 34, and into the back side of the porous ceramic layer 38. During service, cooling air is forced through the passage 82 and diffuses out through the porosity of the ceramic layer 38 as indicated by gas-flow arrows 84. The result is that the turbine blade 20 is cooled by transpiration cooling, rather than (or in addition to) using the conventional cooling approach with the openings 28 of FIG. 1. Transpiration cooling is expected to be more effective in some applications and locations on the turbine blade, because it allows a greater contact time of the cooling air to the interior surfaces of the turbine blade and is more effective in forming a film cooling layer with the gas that flows out through the porosity of the ceramic layer.

With the most preferred embodiment of the present approach, the exteriorly facing portion of the ceramic coating 38 which is exposed to the hot combustion gas is a porous, foam-like ceramic structure defined by the ceramic cell walls 40. This structure has several important advantages. The porosity imparts compliance to the ceramic coating 38, which permits it to flex under the influence of extensions of the turbine blade 20 during service and under the influence of thermal cycling strains. The tendency of the ceramic coating to spall away during service is thereby reduced. The porous ceramic structure also resists impact damage better than does a monolithic ceramic structure, because impact energy may be absorbed by local crushing and compaction of the porous structure and not propagated into its interior. The porous structure reduces the thermal conductivity of the ceramic material, as compared with its monolithic form. Some existing ceramic layers produced by known processes have small amounts of porosity, such as 5 percent by volume or less. The present approach is distinguished from these prior approaches by the greater amount of porosity, exceeding about 20 percent by volume, and by the foam-like morphology of the ceramic as distinct from a columnar morphology.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A structure comprising a substrate; and a ceramic coating overlying and bonded to the substrate, the ceramic coating comprising an open-cell solid foam of ceramic cell walls having an interconnected intracellular volume therebetween, wherein the intracellular volume is substantially empty and porous.

2. The structure of claim 1, wherein the substrate comprises a nickel-base superalloy.

3. The structure of claim 1, wherein the substrate is a component of a gas turbine engine.

4. The structure of claim 1, wherein the ceramic cell walls comprise aluminum oxide.

5. A structure comprising a substrate; and a ceramic coating overlying and bonded to the substrate, the ceramic coating comprising an open-cell solid foam of ceramic cell walls having an interconnected intracellular volume therebetween, wherein the ceramic cell walls comprise from about 60 to about 80 volume percent of the ceramic coating.

6. The structure of claim 5, wherein the intracellular volume is at least in part filled with a metal.

7. The structure of claim 1, further including a bond coat disposed between the substrate and the ceramic coating, the bond coat aiding in bonding the ceramic coating to the substrate.

8. The structure of claim 5, wherein the substrate comprises a nickel-base superalloy.

9. The structure of claim 5, wherein the substrate is a component of a gas turbine engine.

10. The structure of claim 5, wherein the ceramic cell walls comprise aluminum oxide.

11. The structure of claim 5, further including a bond coat disposed between the substrate and the ceramic coating, the bond coat aiding in bonding the ceramic coating to the substrate.

12. A structure comprising a substrate comprising a nickel-base superalloy component of a gas turbine engine; and a ceramic coating overlying and bonded to the substrates the ceramic coating comprising an open-cell solid foam of ceramic cell walls comprising aluminum oxide and having a porous interconnected intracellular volume therebetween, wherein the ceramic cell walls comprise from about 60 to about 80 volume percent of the ceramic coating.

13. A method of preparing a structure protected by a ceramic coating, comprising the steps of providing a substrate having a surface;

depositing a precursor material onto the surface of the substrate, the precursor material comprising a sacrificial ceramic, and a reactive metal which is reactive with the sacrificial ceramic to form an open-celled ceramic foam; and reacting the sacrificial ceramic and the reactive metal to form ceramic cell walls of an oxidized ceramic of the reactive metal, and an interconnected intracellular volume therebetween filled with an intracellular metal.

14. The method of claim 13, including an additional step, after the step of reacting, of removing at least a portion of the intracellular metal.

15. The method of claim 13, wherein the sacrificial ceramic comprises silicon dioxide.

16. The method of claim 13, wherein the reactive metal comprises aluminum.

17. The method of claim 13, wherein the step of depositing includes the steps of depositing a layer of the sacrificial ceramic overlying the surface of the substrate, and depositing a layer of the reactive metal overlying the layer of the sacrificial ceramic.

18. The method of claim 13, wherein the step of depositing includes the steps of depositing a first layer of the sacrificial ceramic overlying the surface of the substrate, and depositing a second layer of the sacrificial ceramic overlying the layer of the reactive metal.

19. The method of claim 13, wherein the step of depositing includes the steps of codepositing a layer comprising the sacrificial ceramic and the reactive metal.

20. The structure of claim 12, further including a bond coat disposed between the substrate and the ceramic coating, the bond coat aiding in bonding the ceramic coating to the substrate.

* * * * *